United States Patent
Jiang et al.

(10) Patent No.: US 11,977,513 B2
(45) Date of Patent: May 7, 2024

(54) DATA FLOW CONTROL IN DISTRIBUTED COMPUTING SYSTEMS

(71) Applicant: Microsoft Technology Licensing, LLC, Redmond, WA (US)

(72) Inventors: Suyang Jiang, Redmond, WA (US); Serguei Vasilyevich Martchenko, Sammamish, WA (US); Yuva Priya Arunkumar, Redmond, WA (US); Aigerim Shintemirova, Seattle, WA (US); Ariane Belle Tsai, Seattle, WA (US); Varadarajan Thiruvillamalai, Redmond, WA (US); Kidus Yohanes Sendeke, Seattle, WA (US)

(73) Assignee: Microsoft Technology Licensing, LLC., Redmond, WA (US)

(*) Notice: Subject to any disclaimer, the term of this patent is extended or adjusted under 35 U.S.C. 154(b) by 0 days.

(21) Appl. No.: 17/585,242

(22) Filed: Jan. 26, 2022

(65) Prior Publication Data
US 2023/0237017 A1    Jul. 27, 2023

(51) Int. Cl.
G06F 16/13       (2019.01)
G06F 16/182     (2019.01)

(52) U.S. Cl.
CPC .......... *G06F 16/134* (2019.01); *G06F 16/183* (2019.01)

(58) Field of Classification Search
CPC ............................ G06F 16/134; G06F 16/183
USPC ...................................................... 707/827
See application file for complete search history.

(56) References Cited

U.S. PATENT DOCUMENTS

| 7,280,476 B2 | 10/2007 | Anderson |
| 7,693,975 B2 | 4/2010 | Sanchez |
| 9,552,550 B2 | 1/2017 | Vasseur et al. |
| 10,135,740 B2 | 11/2018 | Yin et al. |

(Continued)

FOREIGN PATENT DOCUMENTS

CN            111800829 A        10/2020

OTHER PUBLICATIONS

Carlucci, et al., "Analysis and Design of the Google Congestion Control for Web Real-time Communication", In Proceedings of the 7th International Conference on Multimedia Systems, May 10, 2016, 12 Pages.

(Continued)

*Primary Examiner* — Hosain T Alam
*Assistant Examiner* — Tracy M McGhee
(74) *Attorney, Agent, or Firm* — Christopher J. Volkmann; Kelly, Holt & Christenson, PLLC.

(57) ABSTRACT

Techniques of data flow control are disclosed herein. One example technique includes upon receiving a notification indicating a change to a content item in a source shard, parsing the content item to extract data representing attributes of the content item and identifying a partition of the system-wide index based on the extracted data representing the attributes of the content item. The example technique can also include transmitting, to a token issuer, a request for a token that represents a permission to write to the identified partition of the system-wide index and upon receiving a token issued by the token issuer in response to the transmitted request, transmitting the extracted data representing the attributes of the content item along with the received token to write the extracted data in the partition of the system-wide index.

20 Claims, 8 Drawing Sheets

(56) References Cited

U.S. PATENT DOCUMENTS

| | | |
|---|---|---|
| 11,616,725 B1 | 3/2023 | Syed et al. |
| 2008/0008094 A1 | 1/2008 | Gilfix |
| 2011/0239226 A1 | 9/2011 | Placanica |
| 2014/0379506 A1 | 12/2014 | Marshall et al. |
| 2015/0332145 A1* | 11/2015 | Vasseur ................ H04L 43/062 706/12 |
| 2017/0026295 A1* | 1/2017 | Yin ........................ H04L 47/12 |
| 2017/0180254 A1 | 6/2017 | Certain et al. |
| 2021/0126823 A1 | 4/2021 | Poess et al. |
| 2022/0198394 A1 | 6/2022 | Chandra |
| 2023/0327875 A1 | 10/2023 | Tsai et al. |

OTHER PUBLICATIONS

"International Search Report and Written Opinion Issued in POT Application No. PCT/US23/011486", dated Apr. 24, 2023, 11 Pages.

"Non Final Office Action Issued in U.S. Appl. No. 17/714,514", dated May 9, 2023, 17 Pages.

"Notice of Allowance Issued in U.S. Appl. No. 17/714,514", dated Aug. 25, 2023, 21 Pages.

"Token Bucket", Retrieved From: https://en.wikipedia.org/wiki/Token_bucket#Hierarchical_token_bucket, Jan. 30, 2022, 04 Pages.

"Treemapping", Retrieved From: https://en.wikipedia.org/wiki/Treemapping, Nov. 25, 2021, 07 Pages.

"Treemaps", Retrieved From: https://developers.google.com/chart/interactive/docs/gallery/treemap, May 3, 2021, 18 Pages.

"Wikipedia:Please clarify", Retrieved From: https://en.wikipedia.org/wiki/Wikipedia:Please_clarify, Jul. 28, 2021, 6 Pages.

\* cited by examiner

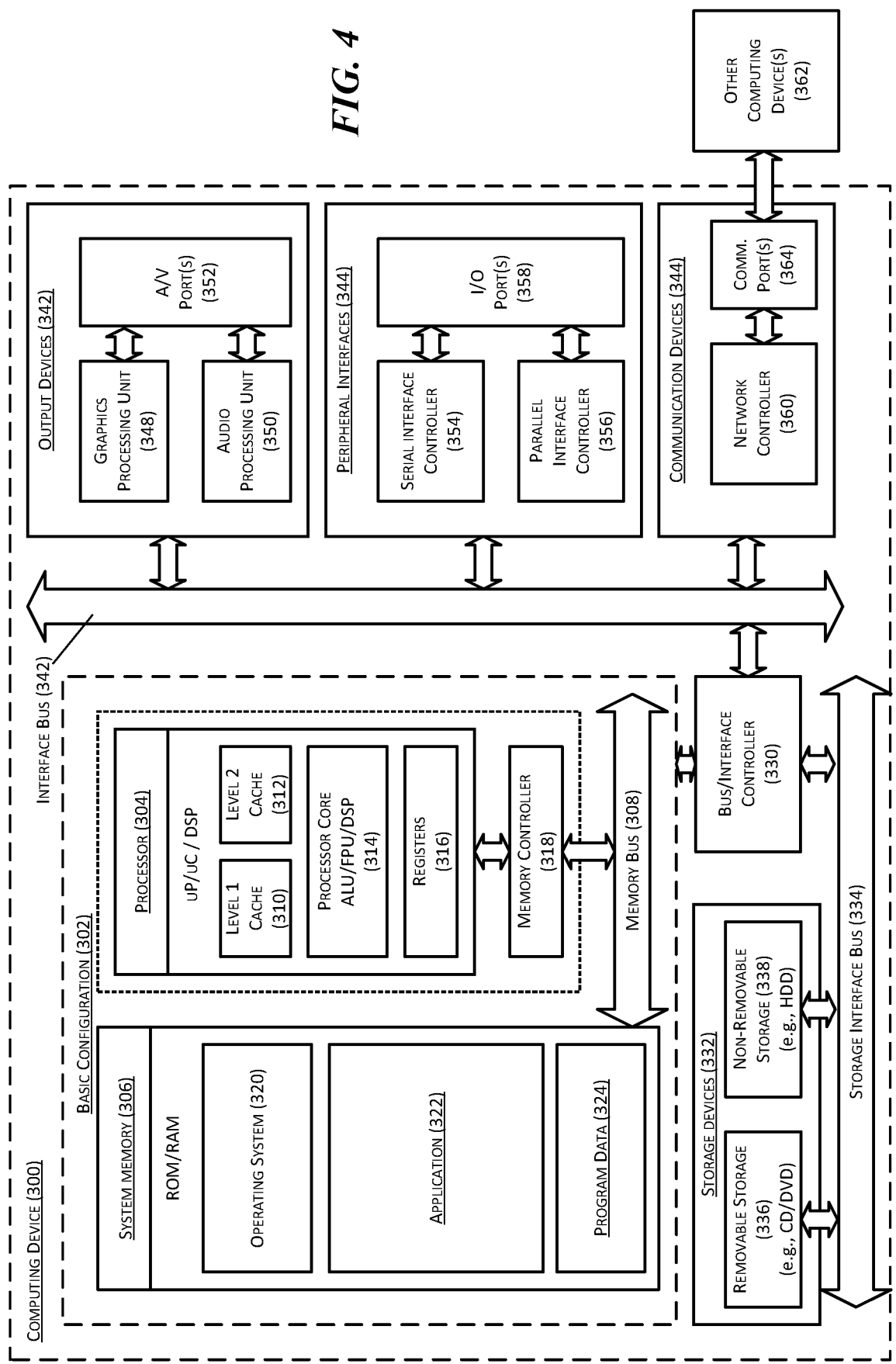

DATA FLOW CONTROL IN DISTRIBUTED COMPUTING SYSTEMS

BACKGROUND

Distributed computing systems typically include routers, switches, bridges, and other types of network devices that interconnect large numbers of servers, network storage devices, or other computing devices. The individual servers can host one or more virtual machines ("VMs"), containers, virtual switches, or other virtualized functions. The virtual machines or containers can facilitate execution of suitable applications for individual users to provide to the users desired cloud services or other suitable computing services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Datacenters or other large-scale distributed computing systems can provide computing resources such as processing power and data storage as computing services accessible to tenants via a computer network. A tenant, such as a corporation, school, or organization, can have multiple users or groups of users with corresponding websites. To facilitate ready access, data relevant to a user, group, or website of a tenant can be stored in a dedicated network location sometimes referred to as a shard. A shard can be a physical and/or logical storage location that contains emails, chats, instant messages, documents, photos, videos, or other types of content items with which the user, group, or website can interact.

Though dedicated shards can facilitate users to efficiently organize storage of data, the distributed nature of the shards is not conducive to system-wide queries across multiple shards, such as queries across multiple shards of a tenant. To facilitate such queries, a system-wide index of content items can be generated by crawling/ingesting data or metadata (referred to herein as file data) of various content items stored in the shards. In certain computing systems, once a content item is generated, modified, or otherwise interacted with in a source shard, a content service can parse the content item and extract various attributes, properties, or file data, such as date created/modified, author, version, storage location, content keywords, etc. from the content item. The content service can then notify an item processor configured to generate/update an entry in a system-wide index of content items. Upon receiving the notification, the item processor can optionally select a subset of the extracted file data of the content item and create an entry in a send queue to transmit the extracted file data (or the subset thereof) to a corresponding partition of the system-wide index. A queue manager can then process the created entry in the send queue and transport, via a link in a computer network, the file data to a receive queue accessible to an index service configured to manage the system-wide index. The index service can then access the extracted file data from the receive queue and store the accessed file data in the partition of the system-wide index.

The foregoing indexing technique, however, may create processing and/or network delays in a distributed computing system. For example, when multiple source shards create large numbers of entries in respective send queues, the queue manager and/or the computer network may be overwhelmed to concurrently process such large numbers of entries. As a result, processing delays at the queue manager and/or congestion in the computer network can cause other computing services in the distributed computing system to be sluggish or even fail. In another example, one or more partitions of the system-wide index may experience processing delays. As a result, retry processing directed toward the one or more partitions can generate high network traffic in the computer network, and thus decreasing usable bandwidth by other computing services.

Several embodiments of the disclosed technology are directed to implementing a flow controller in a distributed computing system to modulate network traffic to update entries at various partitions of a system-wide index of content. The flow controller can be configured as a token issuer to assign multiple tokens for writing to individual partitions of the system-wide index per a time quantum (e.g., a minute, ten minutes, an hour, a day, etc.). A token can include a digital data package that represents a permission to write to a corresponding partition of the system-wide index. In certain embodiments, a token can include a digital object with various data fields configured to contain data representing, for instance, a token identifier, a token number, an assignment date/time, a time to live, or other suitable information. In other embodiments, a token can include other suitable structured or unstructured data representing the foregoing and/or other suitable information. In certain embodiments, the flow controller can be configured to assign the same number of tokens to a partition of the system-wide index per time quantum. In other embodiments, the flow controller can be configured to increase the assigned number of tokens by a fixed amount over a previous time quantum. In further embodiments, the flow controller can be configured to dynamically modulate the assigned numbers of tokens based on observed processing and/or network condition in the computing system, as described in more detail later.

During operation, upon receiving a notification that a content item is generated, modified, or interacted with in the source shard, the item processor can be configured to identify a partition of the system-wide index based on, at least in part, the file data of the content item and transmit, to the flow controller, data representing a request for tokens to write to the identified partition prior to create the entry in the send queue. Upon receiving the request, the flow controller can be configured to determine whether any tokens are available for writing to the identified partition of the system-wide index. In response to determining that tokens are not available, the flow controller can be configured to transmit data representing a denial to the item processor. Upon receiving the denial, the item processor can be configured to refrain from or prevent creating the entry in the send queue. Instead, in certain embodiments, the item processor can be configured to retransmit a token request to the flow controller after pausing for a threshold period (e.g., the time quantum for assigning the tokens or other suitable values). In other embodiments, the item controller can also be configured to skip writing the file data of the content item to the identified partition of the system-wide index after a threshold number of retries have failed.

On the other hand, in response to determining that tokens for writing to the partition of the system-wide index are available, the flow controller can be configured to issue one or more tokens to the item processor and deduct the issued tokens from the available tokens of the partition. In certain examples, the flow controller can be configured to transmit one token per request. In other examples, the flow controller can be configured to transmit multiple tokens that correspond to a data size, item number, or other characteristic of the file data of the content item to be written to the partition of the system-wide index. Only upon receiving the issued token, the item processor can then create an entry in the send queue containing the file data along with the issued token. In turn, the queue manager can then process the created entry by transport the file data of the content item and the issued token to the receive queue accessible to the index service. The index service can then retrieve the file data from the receive queue and store the file data in the identified partition. Upon successfully storing the received file data in the partition, the index service can return the token to the flow controller along with an indication that storage of the file data has been completed successfully.

In certain implementations, the flow controller can be configured to modulate the assigned numbers of tokens per time quantum to the corresponding partition of the system-wide index based on observed processing and/or network conditions in the distributed computing system as reflected in, for instance, the percentage or ratio of returned tokens over issued tokens per time quantum. For example, when one thousand issued tokens are all returned within a time quantum, the flow controller can be configured to increase the assigned number of tokens for the next time quantum based on a high threshold (e.g., 95%) because the one hundred percent return rate exceeds the high threshold to indicate that processing and/or network conditions in the distributed computing system are adequate to process the volume of file data written to the partition. On the other hand, when only five hundred issued tokens are returned out of one thousand issued tokens, the flow controller can be configured to reduce the assigned number of tokens for the next time quantum based on a low threshold (e.g., 80%) because the failure of returning less than the low threshold of the issued tokens indicates processing and/or network traffic delays in the distributed computing system. In other examples, the flow controller can be configured to increase or decrease the assigned numbers of tokens based on other suitable high or low threshold values. In certain implementations, the flow controller can also be configured to continue increasing/decreasing the number of assigned tokens until the percentage or ratio of returned tokens over issued tokens is below/above a corresponding high/low threshold.

The increment or decrement of assigned tokens from one time quantum to another can be a preset or variable value. For example, in certain embodiments, the flow controller can be configured to use the percentage or ratio of returned tokens over issued tokens per time quantum as input to an estimation engine implementing, for instance, a Kalman filter. Based on the percentage or ratio of returned tokens over issued tokens per time quantum, the estimate engine can apply the Kalman filter to generate an estimated number of tokens for the next time quantum. In other embodiments, the estimation engine can also implement Alpha beta filter, inverse variance weighting, covariance intersection, or other suitable types of statistical analysis heuristics.

Several embodiments of the disclosed technology can at least reduce or even prevent processing/network delays in the distributed computing system due to operations of updating various partitions of the system-wide index. By assigning tokens for writing to the individual partitions of the system-wide index, the flow controller can be configured limit the amount of processing and/or network traffic directed to writing file data of content items from multiple source shards to the system-wide index. For example, when one or more source shards have consumed all the tokens assigned to a partition, additional source shards would be prevented from writing to the same partition because the flow controller would reject any additional requests by the additional source shards. Also, when the flow controller observes that the processing/network conditions in the distributed computing system are deteriorating as reflected in a low percentage or ratio of returned tokens over issued tokens, the flow controller can be configured to adjust the assigned number of tokens for the next time quantum to reduce the processing/network traffic directed to updating the system-wide index. Thus, processing and/or network conditions can be improved to facilitate proper execution of additional computing services in the distributed computing system.

BRIEF DESCRIPTION OF THE DRAWINGS

FIG. 4 is a computing device suitable for certain components of the distributed computing system in FIG. 1.

DETAILED DESCRIPTION

Figure 1:
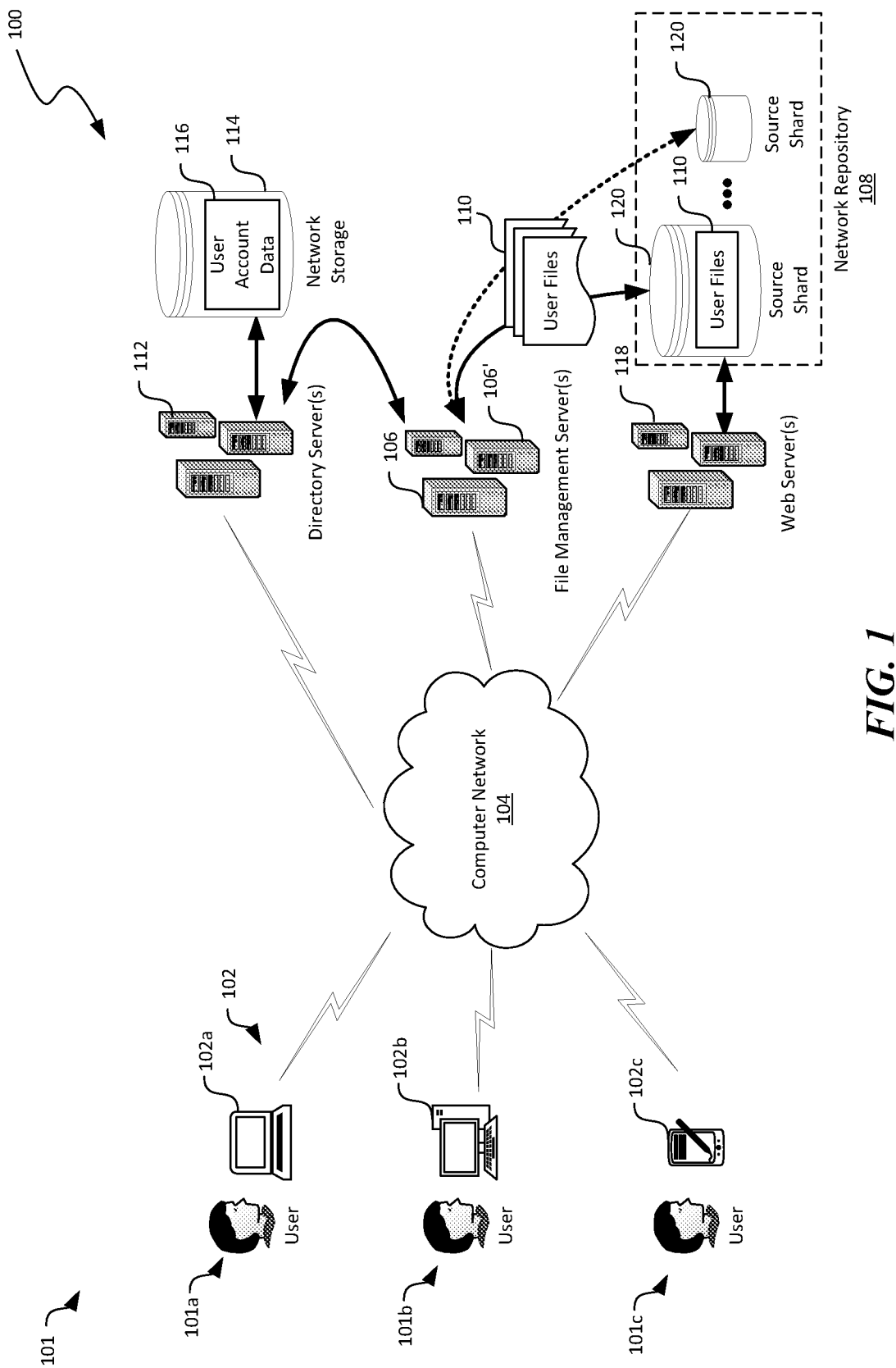
FIG. 1 is a schematic diagram illustrating a distributed computing system implementing data flow control in accordance with embodiments of the disclosed technology.

Certain embodiments of systems, devices, components, modules, routines, data structures, and processes for data flow control in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-4.

As described herein, a distributed computing system can include an interconnected computer network having a plurality of network devices that interconnect a plurality of servers or hosts to one another or to external networks (e.g., the Internet). At least some of the servers or hosts can be in, for example, different datacenters at diverse geographic locations. A network device can include a physical or virtual network device, examples of which include physical or virtual routers, switches, hubs, bridges, load balancers, security gateways, or firewalls. A host can include a computing device configured to implement, for instance, one or more virtual machines, containers, or other suitable virtualized components. For example, a host can include a server having a hypervisor configured to support one or more virtual machines. In another example, a host can include a virtual machine hosting one or more containers or other suitable types of virtual components.

Computer system resource or computing resource can include any physical or virtual component of limited availability within a distributed computing system. Example computing resource can include processor capacities (e.g., CPU), network capacities (e.g., network connections and network bandwidth), and computer readable storage capacities (e.g., memory blocks in solid state devices). Executing an application in a computer system can consume various amount of computing assets. For example, executing an application for voice-over-IP conference can consume an amount of computing and network assets. In another example, executing an application of database management can consume an amount of processor capacities and storage capacities.

A computing service can provide computing resources to users over a computer network such as the Internet. Common examples of computing services include software as a service (SaaS), platform as a service (PaaS), and infrastructure as a service (IaaS). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

FIG. 1 is a schematic diagram illustrating a distributed computing system 100 implementing data flow control in accordance with embodiments of the disclosed technology. As shown in FIG. 1, the distributed computing system 100 can include a computer network 104 interconnecting client devices 102 of users 101, a file management server 106, a directory server 112, and one or more web servers 118. The computer network 104 can include an enterprise intranet, a wide area network, the Internet, or other suitable types of networks.

In certain embodiments, the file management server 106, the directory server 112, and the web servers 118 can each include one or more interconnected computer servers, as shown in FIG. 1. In other embodiments, the foregoing components of the distributed computing system 100 can each include a cloud-based service hosted on one or more remote computing facilities such as datacenters. In further embodiments, certain components (e.g., the web servers 118) may be omitted from the distributed computing system 100 in FIG. 1, and the corresponding functions can be provided by external computing systems (not shown).

The distributed computing system 100 can also include a network storage 114 operatively coupled to the directory server 112. The network storage 114 can be configured to store records of user account data 116. In certain embodiments, example user account data 116 include usernames, user locations, user alias, user pictures, user contact information, access control credentials, and/or other suitable types of user information. In other embodiments, the user account data 116 can also include other suitable information.

As shown in FIG. 1, the distributed computing system 100 can further include a network repository 108 operatively coupled to the web servers 118 and. The network repository 108 can be configured to store records of user files 110 accessible to the users 101 via the client devices 102 and the computer network 104. The user files 110 can include any suitable application data created, modified, used, interacted with, or otherwise accessible to the users 101. For instance, examples of the user files 110 can include documents, images, videos, chats, emails, calendar items, or other suitable types of digital objects.

As illustrated in FIG. 1, the network repository 108 can include multiple storage locations referred to as source shards 120. The source shards 120 can be physically and/or logically separate from one another. Each source shard 120 can be configured to contain user files 110 for individual users 101, user groups, or websites of a tenant. For example, documents, calendar items, chats, and emails of a website can be stored in a single source shard 120. In another example, documents of a user 101 can be stored in a different source shard 120. Though only two source shards 120 are illustrated in FIG. 1, in other embodiments, the distributed computing system 100 can include hundreds, thousands, even millions of source shards 120.

Even though particular components and associated arrangements of the distributed computing system 100 are shown in FIG. 1, in other embodiments, the distributed computing system 100 can include additional and/or different components. For example, in certain embodiments, the network repository 108 and the network storage 114 can be combined into a single physical or logical storage space accessible via the computer network 104. In further embodiments, the distributed computing system 100 can also include additional servers, network storages, load balancers, or other suitable components.

The client devices 102 can individually include a computing device that facilitates access to the source shards 120 of the network repository 108 via the computer network 104 by the users 101. For example, in the illustrated embodiment, the first client device 102a is a laptop computer. The second client device 102b is a desktop computer. The third client device 102c is a tablet computer. In other embodiments, the client devices 102 can also include smartphones, tablets, or other suitable computing devices. Even though three users 101a-101c are shown in FIG. 1 for illustration purposes, in other embodiments, the distributed computing system 100 can facilitate any suitable number of users 101 access to the network repository 108 via the computer network 104.

The web servers 118 can be configured to provide the user files 110 to the users 101 via the computer network 104. For example, in one embodiment, the web servers 118 can be configured to provide an enterprise internal website that allows the users 101 to securely exchange messages (e.g., chats or emails) and to cooperate on performing tasks or executing a project. In other embodiments, the web servers 118 can also be configured to provide a social network website that allows the users 101 to post user files 110, comment on one another's user files 110, share and/or recommend user files 110 with additional users 101, or perform other suitable actions. In certain embodiments, the web servers 118 can also be configured to receive and store the user files 110 in the network repository 108 in cooperation with the file management server 106. In other embodiments, the distributed computing system 100 can further include a database server (not shown) or other suitable components configured to perform the foregoing functions.

The directory server 112 can be configured to maintain the user account data 116 for the users 101 and facilitate various account related operations, such as access control, data queries, etc. For example, in one embodiment, the directory server 112 can implement access control policies such that certain class, type, category, or other suitable grouping of the user files 110 can be accessible to specified users 101. In another embodiment, the directory server 112 can also be configured to share with various file management servers 106 data representing the geographic locations of the source shards 120 corresponding to the various users 101.

The file management server 106 can be configured to facilitate efficient storage, management, and retrieval of the user files 110 by using the source shards 120 corresponding to the users 101. For example, the file management server 106 can be configured to receive, store, retrieve, and update one or more of the user files 110 based on input from the users 101. In other examples, the file management server 106 can also be configured to track versions of a single user file 110 or perform other suitable operations on the user files 110.

To facilitate ready access, data relevant to a user, group, or website can be stored in a dedicated source shard 120. Though dedicated source shards 120 can facilitate users 101 to efficiently organize storage of user files 110, the distributed nature of the source shards 120 is not conducive to tenant-wide queries across multiple source shards 120. To facilitate such queries, a system-wide index (e.g., a tenant-wide index) of user files 110 can be generated by crawling/ingesting data or metadata of various content items (referred to herein as file data) stored in the source shards 110. However, such indexing may create processing and/or network delays in a distributed computing system. For example, when multiple source shards 120 create large numbers of updates to the system-wide index, the computer network 104 may be overwhelmed to simultaneously process such large numbers of updates. As a result, congestion in the computer network 140 can cause other computing services in the distributed computing system 100 to be sluggish or even fail.

Several embodiments of the disclosed technology are directed to implementing a flow controller 136 (shown in FIG. 2A) in the distributed computing system 100 to modulate network traffic to various partitions of a distributed index such as a system-wide index 121 (shown in FIG. 2A) of user files 110. By assigning tokens for writing to individual partitions of the system-wide index 121, the flow controller 136 can be configured as a token issuer to limit the amount of processing and/or network traffic directed to writing data to the system-wide index 121. Also, when the flow controller 136 observes that the processing/network conditions in the distributed computing system 100 are deteriorating, the flow controller 136 can be configured to reduce the processing/network traffic directed to updating the system-wide index 121 from one time quantum to a subsequent time quantum. Thus, processing and/or network conditions can be improved to facilitate proper execution of additional computing services in the distributed computing system 100, as described in more detail below with reference to FIGS. 2A-2D.

Figure 2A:
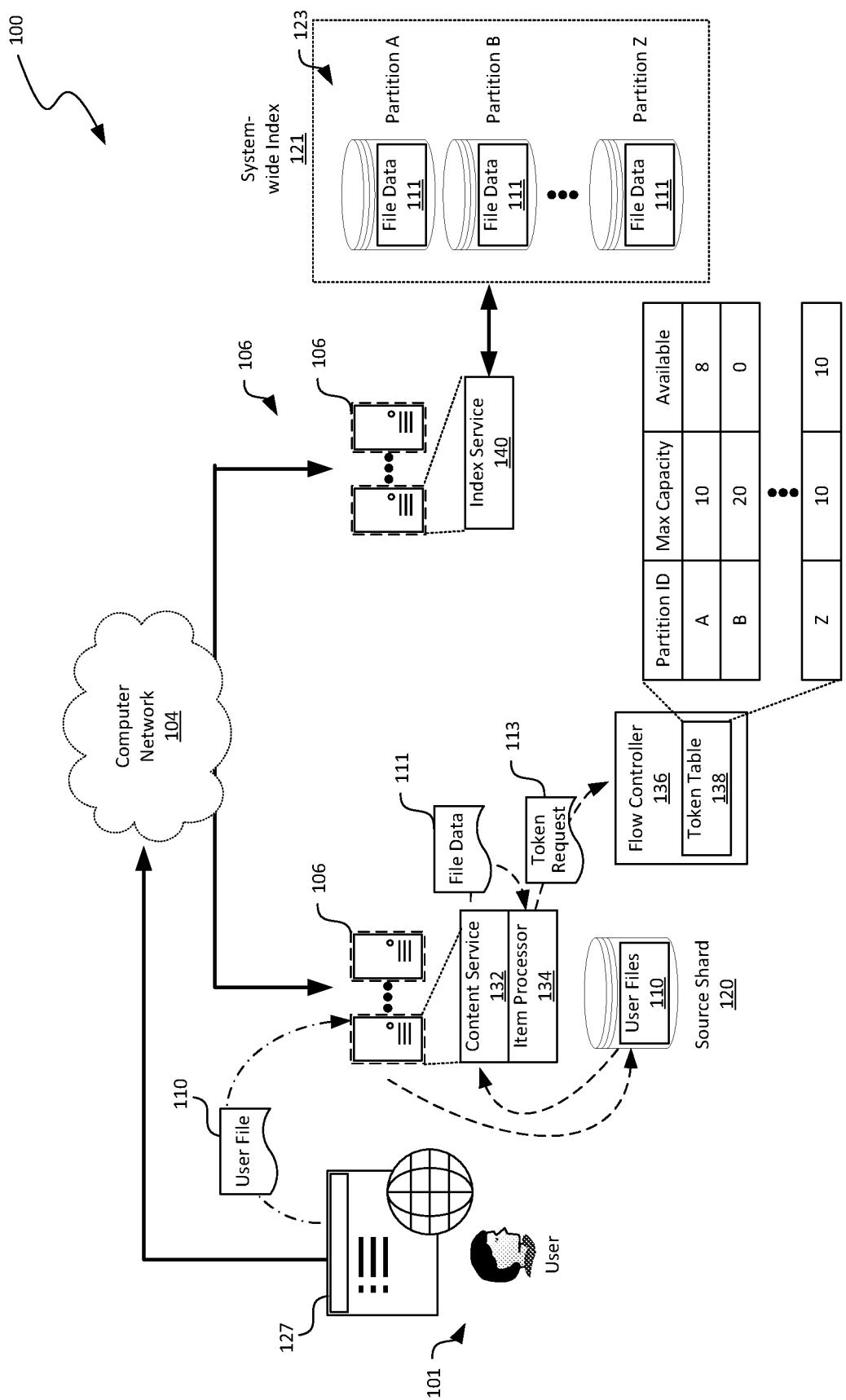
FIGS. 2A-2D are schematic diagrams illustrating example operations of the distributed computing system 100 in FIG. 1 for federating data during query time in accordance with embodiments of the disclosed technology.

As shown in FIG. 2A, in certain embodiments, the file management servers 106 can individually execute suitable instructions to provide a content service 132, an item processor 134, a flow controller 136, and an index service 140. In other embodiments, the foregoing computing services may be provided by the directory server 112, the web server 118, or other suitable servers (not shown) in the distributed computing system 100. The content service 132 can be configured to manage user interactions with content items such as user files 110. For example, the file management server 106 can be configured to facilitate the user 101 to create, modify, or interact with a user file 110. The file management server 106 can then store the user file 110 in the source shard 120.

Upon detecting that the user file 110 in the source shard 120 has been created, modified, or interacted with, the content service 132 can be configured to parse the user file 110 and extract attributes, properties, or file data 111, such as date created/modified, author, version, storage location, content keywords, etc. from the user file 110. The content service 132 can then be configured to notify the item processor 134 that is configured to generate/update an entry in the system-wide index 121. As shown in FIG. 2A, the system-wide index 121 can include multiple partitions 123 each containing file data 111 of corresponding user files 110. In the illustrated example, the system-wide index 121 is divided into partition A to partition Z. In other examples, the system-wide index 121 can be divided into partitions 123 in other suitable fashions. In FIG. 2A and in other figures herein, partitions 123 are shown as separate physical storage units for illustration purposes. In other embodiments, one or more partitions 123 of the system-wide index 121 can include a logical collection of multiple physical storage units or sub-units (not shown).

Upon receiving the notification of incoming file data 111, the item processor 134 can be configured to optionally select a subset of the extracted file data 111 of the user file 110 and identify a partition 123 of the system-wide index 121 for storing the file data 111. In certain embodiments, the item processor 134 can be configured to identify the partition 123 by hashing at least a portion of the file data 111, analyzing metadata included in the file data 111, or in other suitable ways. Upon identifying the partition 123, the item process 134 can be configured to transmit data representing a token request 113 to the flow controller 136 prior to initiating transmission of the file data 111 to the identified partition 123.

The flow controller 136 can be configured to issue or reject the token request 113 by managing an accounting of available tokens for each partition 123 of the system-wide index 121 using, for instance, a token table 138. For example, as shown in FIG. 2A, the token table 138 can include columns corresponding to partition ID, max capacity, and available tokens and rows corresponding to each partition 123. Thus, in the illustrated example, partition A has a max capacity of ten tokens while eight tokens are currently available. Partition B has a max capacity of twenty tokens while zero are currently available. Partition Z has a max capacity of ten tokens that are all available. In other examples, the flow controller 136 can be configured to manage the accounting of available tokens using a database, a spreadsheet, or other suitable data structures.

The flow controller 136 can be configured to assign multiple tokens for writing to individual partitions 123 of the system-wide index 121 per a time quantum (e.g., a minute, ten minutes, an hour, a day, etc.). A token can include a digital data package that represents a permission to write to a partition 123 of the system-wide index 121. In certain embodiments, a token can include a digital object with various data fields configured to contain data representing, for instance, a token identifier, a token number, an assignment date/time, a time to live, or other suitable information. In other embodiments, a token can include other suitable structured or unstructured data representing the foregoing and/or other suitable information.

In certain embodiments, the flow controller 136 can be configured to assign the same number of tokens to a partition 123 (e.g., partition A) of the system-wide index 121 per time quantum. In other embodiments, the flow controller 136 can be configured to increase the assigned number of tokens by a fixed amount over a previous time quantum. In further embodiments, the flow controller 136 can be configured to dynamically modulate the assigned number of tokens based on observed processing/network condition in the computing system, as described in more detail below with reference to FIG. 2D.

Figure 2B:
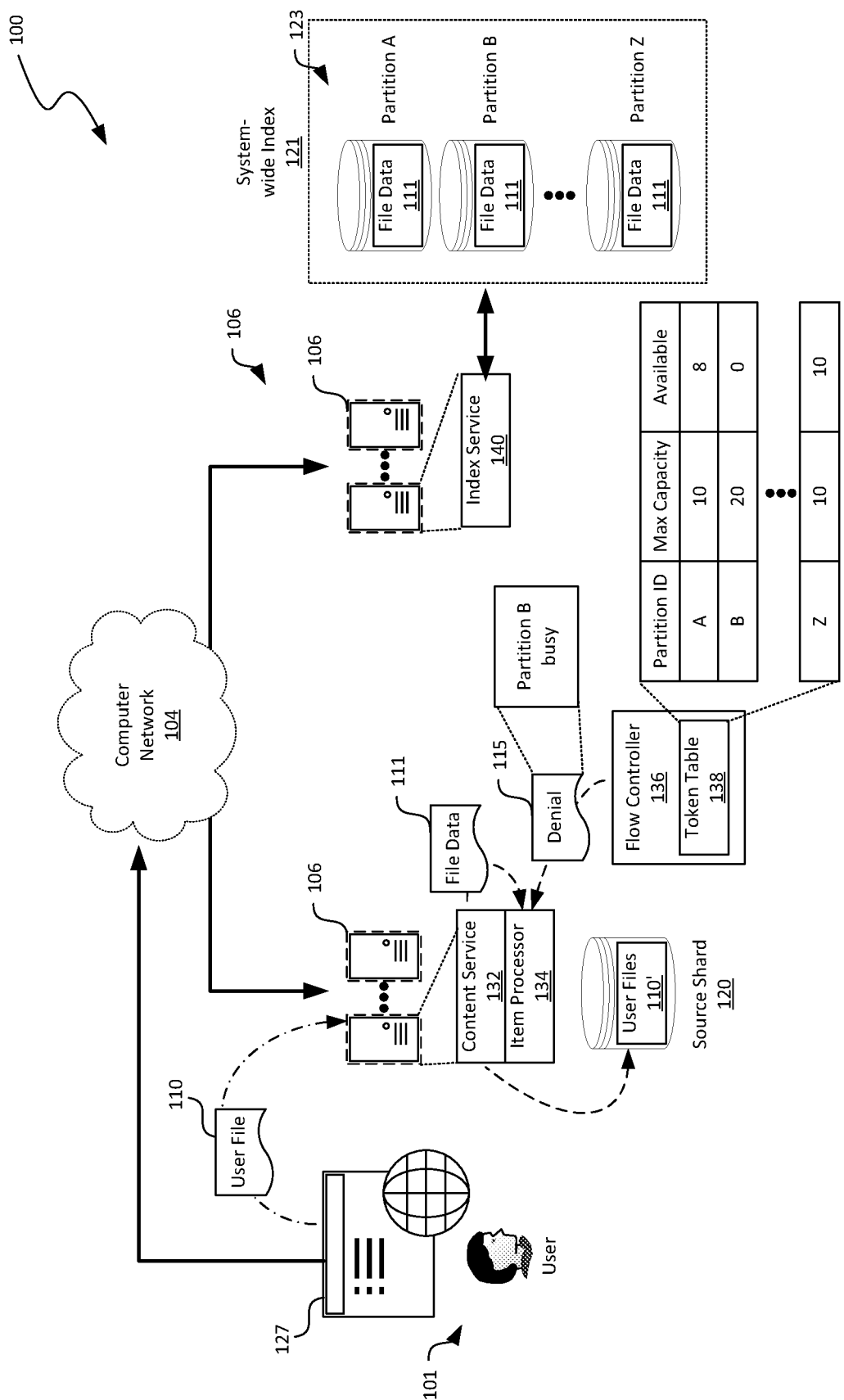

As shown in FIG. 2A, upon receiving the token request 113, the flow controller 136 can be configured to determine whether any tokens are available for writing to the identified partition 123 of the system-wide index 121. In response to determining that tokens are not available, for instance, partition B has zero available tokens, the flow controller 136 can be configured to transmit data representing a denial 115 to the item processor 134, as shown in FIG. 2B. The denial 115 can include data indicating that partition B is busy or other unavailable. Upon receiving the denial 115, the item processor 134 can be configured to refrain from writing to the identified partition 123. Instead, in certain embodiments, the item processor 134 can be configured to retransmit a token request (not shown) to the flow controller 136 after a threshold period (e.g., the time quantum for assigning the tokens or other suitable values). In other embodiments, the item controller 134 can also be configured to skip writing the file data 111 to the identified partition 123 of the system-wide index 121 after a threshold number of retries have failed.

Figure 2C:
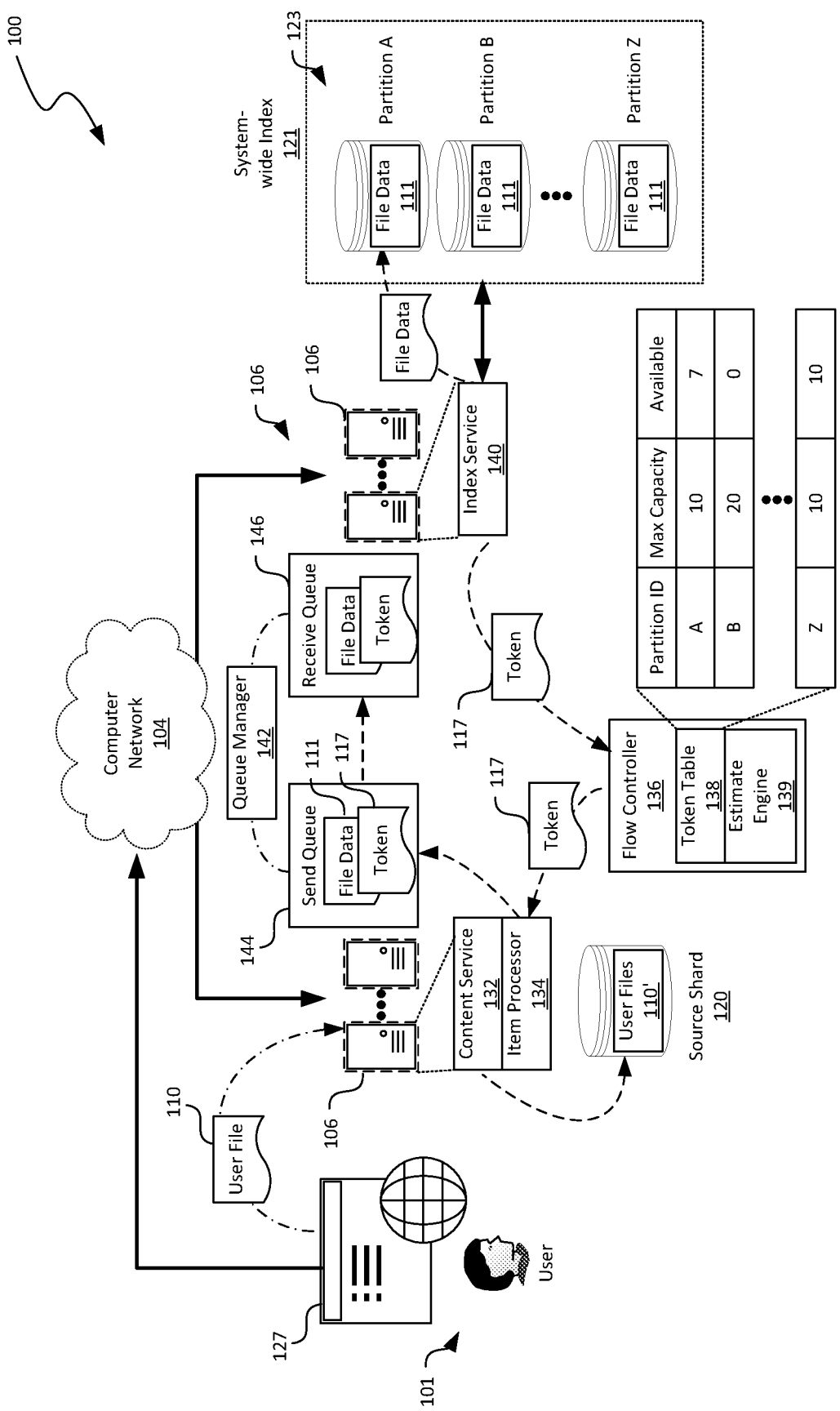

On the other hand, as shown in FIG. 2C, in response to determining that tokens for writing to the partition 123 of the system-wide index 121 are available, for instance, partition A has eight available tokens, the flow controller 136 can be configured to issue one or more tokens 117 to the item processor 134 and deduct the issued tokens from the available tokens in the token table 138. In certain examples, the flow controller 136 can be configured to transmit one token per request. Thus, as shown in FIG. 2C, the available number of tokens for partition A is deducted by one. In other examples, the flow controller 136 can be configured to transmit multiple tokens that correspond to a data size, item number, or other characteristic of the file data 111 to be written to the partition 123 of the system-wide index 121.

Upon receiving the issued token 117, the item processor 134 can be configured to transmit the file data 111 to the identified partition 123. For example, in certain embodiments, the item processor 134 can be configured to create an entry containing the file data 111 in a send queue 144 along with the token 117. In turn, a queue manager 142 can be configured to process the created entry by transport the file data 111 and the issued token 117 to a receive queue 146 accessible to the index service 140. The index service 140 can then retrieve the file data 111 from the receive queue 146 and store the file data 111 in the identified partition 123, e.g., partition A, as illustrated in FIG. 2C. Upon successfully storing the received file data 111 in the partition 123, the index service 140 can be configured to return the token 117 received along with the file data 111 to the flow controller 136 along with an indication that storage of the file data 111 has been completed successfully.

In certain implementations, the flow controller 136 can be configured to modulate the assigned number of tokens 117 per time quantum to a partition 123 of the system-wide index 121 based on observed processing/network conditions in the distributed computing system 100 as reflected in a percentage or ratio of returned tokens 117 over issued tokens 117 per time quantum. For example, when one thousand issued tokens 117 are all returned within a current time quantum, the flow controller 136 can be configured to increase the assigned number of tokens 117 to a partition 123 for the next time quantum at or near expiration of the current time quantum based on a high threshold (e.g., 95%) because the one hundred percent return rate exceeds the high threshold to indicate that processing and/or network conditions in the distributed computing system 100 are adequate to process the volume of file data 111 written to the partition 123. On the other hand, when only five hundred or other suitable numbers of issued tokens are returned out of one thousand issued tokens, the flow controller 136 can be configured to reduce the assigned number of tokens 117 for the next time quantum at or near expiration of the current time quantum based on a low threshold (e.g., 80%) because the failure of returning less than the low threshold of the issued tokens 117 indicates processing and/or network traffic delays in the distributed computing system 100. In other embodiments, the flow controller can be configured to increase the assigned number of tokens by a fixed amount over a previous time quantum. In certain implementations, the flow controller 136 can also be configured to continue increasing/decreasing the number of assigned tokens until the percentage or ratio of returned tokens over issued tokens is below/above a corresponding high/low threshold.

Figure 2D:
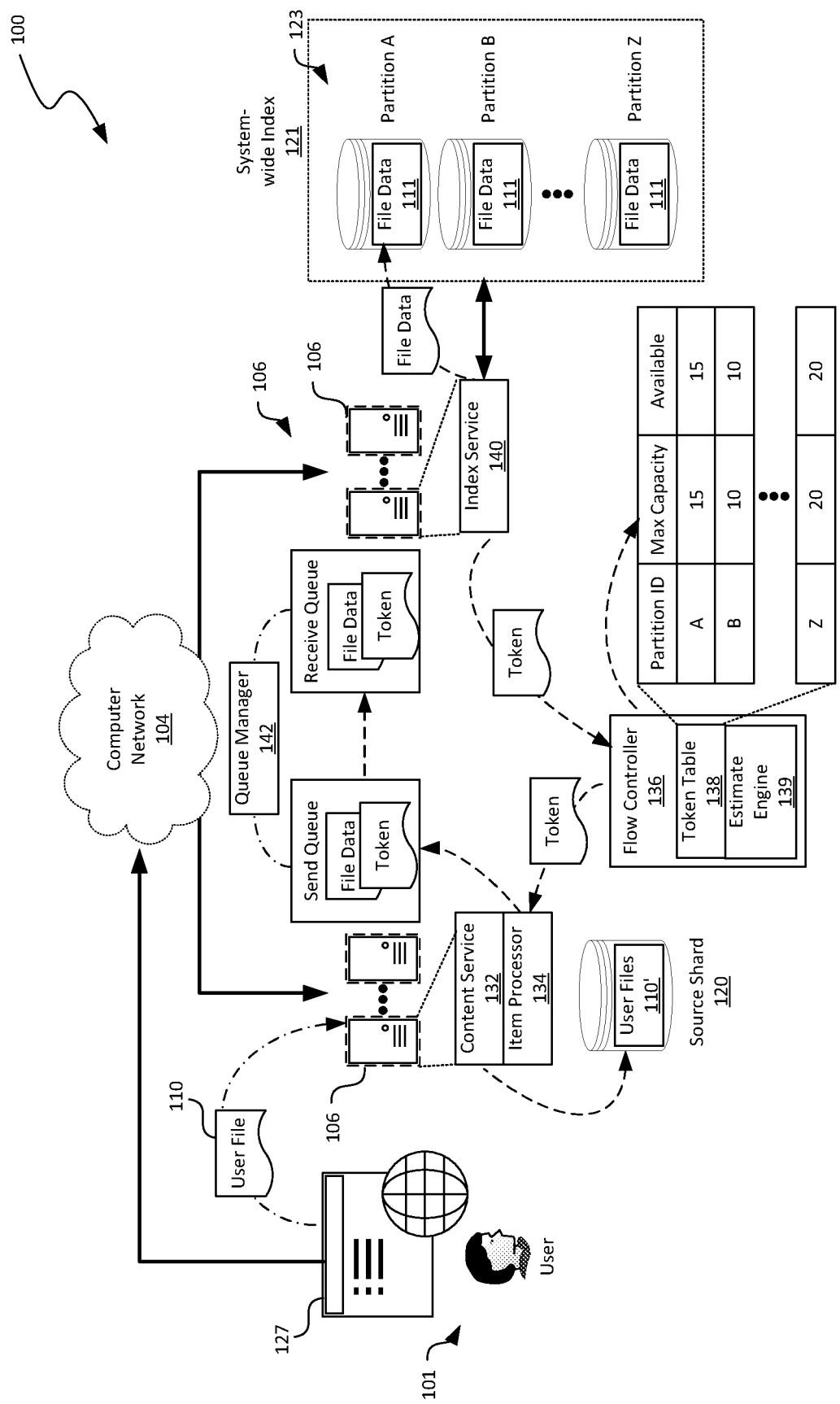

The increment or decrement of assigned tokens from one time quantum to another can be a preset or variable value. For example, in certain embodiments, the flow controller 136 can be configured to use the percentage or ratio of returned tokens over issued tokens per time quantum as input to an estimation engine 139 implementing, for instance, a Kalman filter. Based on the percentage or ratio of returned tokens over issued tokens per time quantum, the estimate engine 139 can apply the Kalman filter to generate an estimated number of tokens 117 for the next time quantum. In other embodiments, the estimation engine 139 can also implement Alpha beta filter, inverse variance weighting, covariance intersection, or other suitable types of statistical analysis heuristics. As shown in FIG. 2D, at or near expiration of the current time quantum, for the next time quantum, the flow controller 136 can assign fifteen, ten, and twenty tokens 117 to partitions A, B, and Z, respectively based on the percentage or ratio of returned tokens over issued tokens per time quantum for each of the partitions 123.

Several embodiments of the disclosed technology can at least reduce or even prevent processing/network delays in the distributed computing system 100 due to operations of updating various partitions 123 of the system-wide index 121. By assigning tokens for writing to individual partitions 123 of the system-wide index 121, the flow controller 136 can be configured limit the amount of processing and/or network traffic directed to writing file data 111 to the system-wide index 123. For example, when one or more source shards 120 have consumed all or most of the tokens assigned to a partition during a time quantum, additional source shards 120 would be prevented from writing to the same partition 123 because the flow controller 136 would reject any additional token requests 113 by the additional source shards 120. Also, when the flow controller 136 observes that the processing/network conditions in the distributed computing system 100 are deteriorating as reflected in a low percentage or ratio of returned tokens over issued tokens, the flow controller 136 can be configured to adjust the assigned number of tokens 117 for the next time quantum to reduce the processing/network traffic directed to updating the system-wide index 121. Thus, processing and/or network conditions can be improved to facilitate proper execution of additional computing services in the distributed computing system 100.

FIGS. 3A-3D are flowcharts illustrating processes of data flow control in accordance with embodiments of the disclosed technology. Though embodiments of the processes are described below in the context of the distributed computing system 100 of FIGS. 1-2D, in other embodiments, the processes may be implemented in computing systems with additional and/or different components.

Figure 3A:
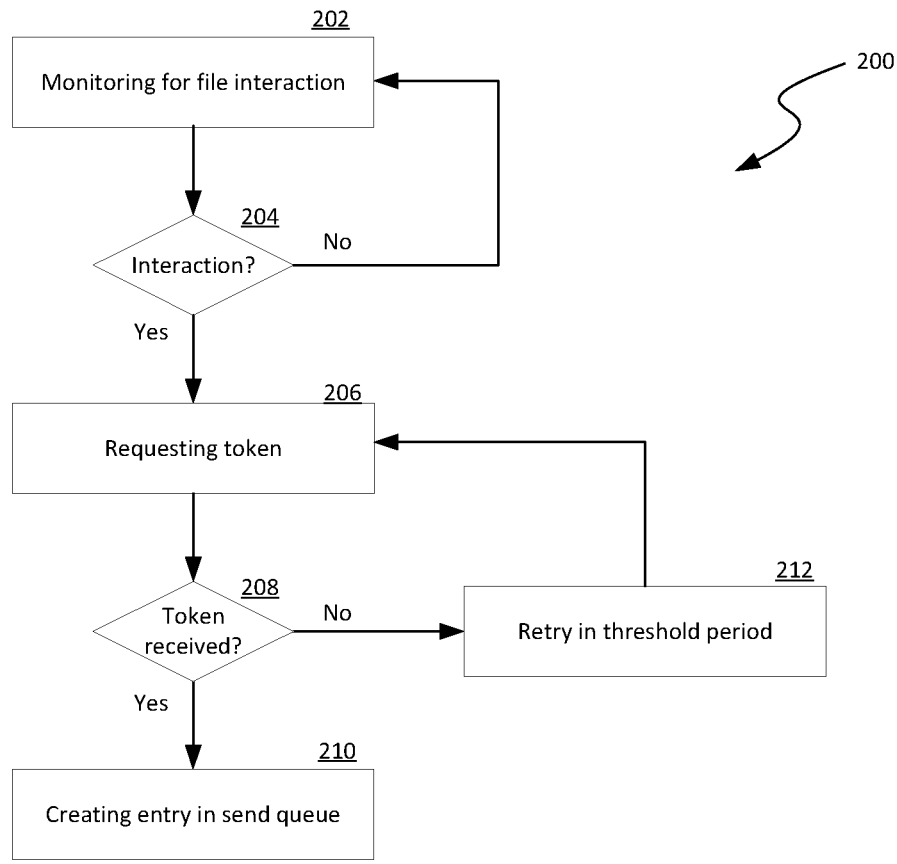
FIGS. 3A-3D are flowcharts illustrating processes of data flow control in accordance with embodiments of the disclosed technology.

As shown in FIG. 3A, a process 200 can include monitoring for file interactions at stage 202. In certain embodiments, file interactions can include a user 101 (FIG. 1) creating, modifying, commenting, reading, sharing, or otherwise accessing a user file 110 (FIG. 1). In other embodiments, file interactions can also include other suitable user actions on the user file 110. The process 200 can then include a decision stage 204 to determine whether a file interaction is detected. In certain embodiments, a file interaction is detected when an indication from, for instance, the content service 132 (FIG. 2A) is received. In other embodiments, a file interaction is detected by scanning one or more user files 110 in a source shard 120 (FIG. 1) or via other suitable means. In response to determining that a file interaction is not detected, the process 200 reverts to monitoring for file interaction at stage 202. Otherwise, the process 200 proceeds to requesting a token for updating the system-wide index 121 (FIG. 2A) at stage 206. Example of requesting and issuing tokens are described in more detail above with reference to FIG. 2B. The process 200 can then include another decision stage 208 to determine whether a token for updating the system-wide index is received. In response to determining that a token is not received within a threshold period or a denial for token is received, the process 200 proceeds to retrying requesting for a token in a threshold period at stage 212. Otherwise, the process 200 proceeds to creating an entry in a send queue for transmitting file data to the system-wide index at stage 210.

Figure 3B:
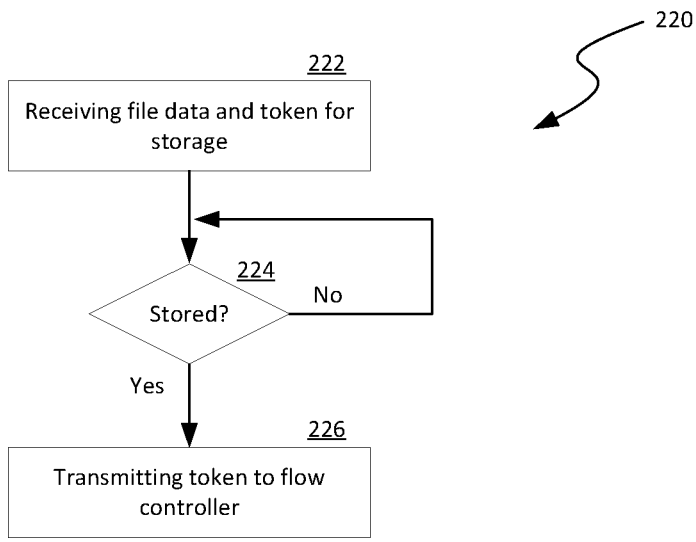

As shown in FIG. 3B, another process 220 can include receiving file data for updating the system-wide index and a token at stage 222. The process 220 can then include a decision stage 224 to determine whether the received file data is stored successfully to update the system-wide index. In response to determining that the file data is stored successfully, the process 220 can proceed to transmitting the received token to the flow controller 136 (FIG. 2A). Otherwise, the process 220 can pause for a threshold period before reverting to determining whether the received file data is stored successfully at stage 224.

Figure 3C:
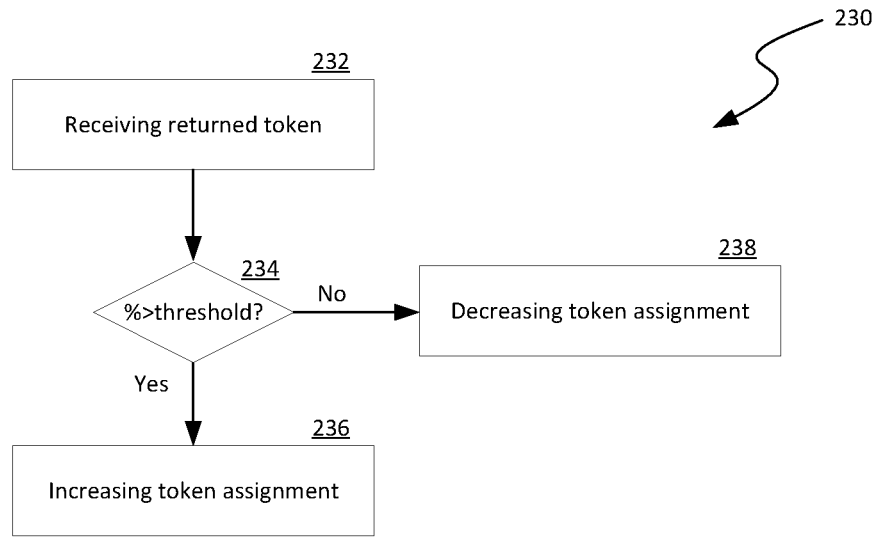
Figure 3D:
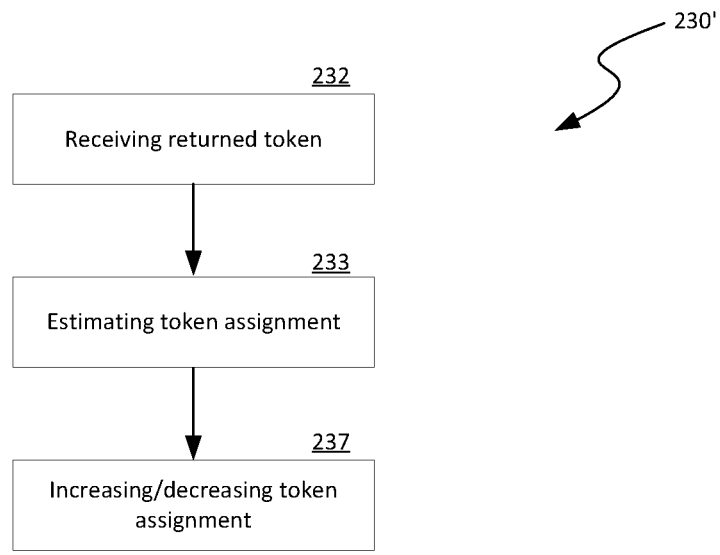

As shown in FIG. 3C, another process 230 can include receiving a token returned to, for instance, the flow controller 136 (FIG. 2A) from the index service 140 (FIG. 2A) at stage 232. The process 230 can then include, at or near expiration of a time quantum, a decision stage 234 to determine whether a percentage or ratio of returned tokens over issued tokens is above a threshold. In response to determining that the percentage or ratio is above the threshold, the process 230 can proceed to increasing token assignment for the next time quantum at stage 236. Otherwise, the process 230 can proceed to decreasing token assignment for the next time quantum at stage 238. The token assignment can be increased or decreased in various ways, examples of which are described above with reference to FIGS. 2C and 2D. Alternatively, as shown in FIG. 3D, instead of the decision stage 234, the process 230' can include a stage 233 at which token assignment is estimated based on a percentage or ratio of returned tokens over issued tokens, as described in more detail above with reference to FIGS. 2C and 2D. The process 230' can proceed to increasing/decreasing the token assignment for the next time quantum at stage 237 based on the estimated token assignment from stage 233.

FIG. 4 is a computing device 300 suitable for certain components of the distributed computing system 100 in FIG. 1. For example, the computing device 300 can be suitable for the client devices 102, file management server 106, the directory server 112, or the web server 118 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. The operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for data flow control in a distributed computing system having multiple servers configured to provide multiple source shards storing content items, the method comprising:
   providing a system-wide index that indexes the content items; stored on the multiple source shards provided on the multiple servers, the system-wide index having multiple partitions, wherein each respective partition, of the multiple partitions, stores a portion of the system-wide index based on token assignment to the respective partition;
   receiving, at a content service in the distributed computing system, a notification indicating a change to a content item stored in a source shard; and
   in response to receiving the notification indicating the change to the content item in the source shard, at the content service,
      parsing the content item to extract data representing attributes of the content item;
      identifying a particular partition, of the multiple partitions in the system-wide index, based on the extracted data representing the attributes of the content item;
      upon identifying the particular partition of the system-wide index, transmitting, to a token issuer, a request for a token that represents a permission to write to the particular partition of the system-wide index; and
      upon receiving a token issued by the token issuer in response to the request transmitted to the token issuer, transmitting the extracted data representing the attributes of the content item along with the token to write the extracted data in the particular partition of the system-wide index using the permission represented by the token.

2. The method of claim 1, further comprising:
   upon successfully writing the extracted data in the particular partition of the system-wide index, transmitting the token to the token issuer along with an indication that writing the extracted data in the particular partition is completed.

3. The method of claim 1, further comprising:
   upon receiving a denial to the request for a token,
      refraining from transmitting the extracted data representing the attributes of the content item to the particular partition of the system-wide index; and
      subsequently, retransmitting the request for a token after a threshold period.

4. The method of claim 1, further comprising:
   upon receiving a denial to the request for a token,
      incrementing a total number of denials for writing to the particular partition of the system-wide index;
      determining whether the total number of denials exceed a threshold; and
      in response to determining that the total number of denials exceeds the threshold, ceasing retransmitting of the request for a token.

5. The method of claim 1 wherein parsing the content item includes parsing the content item to extract one or more of a date created/modified, an author, a version, a storage location, or one or more content keywords corresponding to the content item.

6. The method of claim 1 wherein;
   parsing the content item includes parsing the content item to extract one or more of a date created/modified, an author, a version, a storage location, or one or more content keywords corresponding to the content item; and
   identifying the particular partition of the system-wide index includes hashing the extracted one or more of the date created/modified, the author, the version, the storage location, or the one or more content keywords corresponding to the content item.

7. The method of claim 1 wherein:
   transmitting the extracted data includes:
      creating an entry in a send queue, the entry containing the extracted data and the received token; and
      transporting the created entry from the send queue to a received queue corresponding to the particular partition of the system-wide index.

8. The method of claim 1 wherein:
   transmitting the extracted data includes:
      creating an entry in a send queue, the entry containing the extracted data and the token;
      transporting the created entry from the send queue to a received queue accessible by the particular partition of the system-wide index; and accessing the extracted data in the entry from the received queue; and writing the extracted data to the particular partition of the system-wide index.

9. The method of claim 1 wherein:

transmitting the extracted data includes:

creating an entry in a send queue, the entry containing the extracted data and the token;

transporting the created entry from the send queue to a received queue accessible by the particular partition of the system-wide index;

accessing the extracted data in the entry from the received queue and writing the extracted data to the particular partition of the system-wide index; and transmitting the received token to the token issuer along with an indication that the extracted data is stored in the particular partition successfully.

10. A computing device, comprising:

a processor; and a memory operatively coupled to the processor, the memory having instructions executable by the processor to cause the computing device to:

receive, at the computing device, a notification indicating a change to a content item stored in a source shard; and in response to receiving the notification indicating the change to the content item in the source shard, extract data representing attributes of the content item from the content item;

based on the extracted data representing the attributes of the content item, identify a partition of a plurality of partitions in a system-wide index that indexes content items stored on multiple source shards provided on multiple servers of a distributed system, wherein each respective partition, of the plurality of partitions, stores a portion of the system-wide index based on token assignment to the respective partition;

upon identifying the partition of the system-wide index, transmit, to a token issuer, a request for a token that represents a permission to write to the partition of the system-wide index; and only after receiving a token, that represents the permission, issued by the token issuer in response to the request transmitted to the token issuer, transmit the extracted data representing the attributes of the content item along with the token to write the extracted data in the partition of the system-wide index using the permission represented by the token.

11. The computing device of claim 10 wherein the memory includes additional instructions executable by the processor to cause the computing device to:

upon receiving a denial to the request, refrain from transmitting the extracted data representing the attributes of the content item to the partition of the system-wide index; and subsequently, retransmit the request for a token after a threshold period.

12. The computing device of claim 10 wherein the memory includes additional instructions executable by the processor to cause the computing device to:

upon receiving a denial to the request, increment a total number of denials for writing to the identified partition of the system-wide index;

determine whether the total number of denials exceed a threshold; and in response to determining that the total number of denials exceeds the threshold, cease retransmitting of the request for a token.

13. The computing device of claim 10 wherein to parse the content item includes to parse the content item to extract one or more of a date created/modified, an author, a version, a storage location, or one or more content keywords corresponding to the content item.

14. The computing device of claim 10 wherein the memory includes instructions executable by the processor to cause the computing device:

to parse the content item to extract one or more of a date created/modified, an author, a version, a storage location, or one or more content keywords corresponding to the content item; and identify the partition of the system-wide index based on hash of the extracted one or more of the date created/modified, the author, the version, the storage location, or the one or more content keywords corresponding to the content item.

15. The computing device of claim 10 wherein the memory includes instructions executable by the processor to cause the computing device:

create an entry in a send queue, the entry containing the extracted data and the received token; and transport the created entry from the send queue to a received queue corresponding to the partition of the system-wide index.

16. A method for data flow control in a distributed computing system having multiple servers configured to provide multiple source shards storing content items and a system-wide index of the stored content items, the system-wide index having multiple partitions, wherein the method comprising:

receiving, at a server in the distributed computing system, multiple requests for tokens each representing a permission to write data to a partition of the system-wide index; and in response to receiving the multiple requests, accessing a token table to determine whether the partition of the system-wide index has sufficient tokens available to satisfy the multiple requests;

in response to determining that the partition of the system-wide index has sufficient tokens available to satisfy the multiple requests, transmitting the requested tokens in response to the received multiple requests; and decrementing the available tokens of the partition by a number of the transmitted tokens; and in response to determining that the partition of the system-wide index does not have sufficient tokens available to satisfy one of the multiple requests, transmitting a denial in response to the received request.

17. The method of claim 16, further comprising:

receiving, at the server, one or more tokens previously transmitted in response to the received multiple requests along with indications that the data is written to the partition of the system-wide index successfully; and in response to receiving the token previously transmitted, calculating a percentage or ratio of a number of the received one or more tokens over the number of the transmitted tokens;

determining whether the calculated percentage or ratio is below a threshold; and in response to determining that the calculated percentage or ratio is below the threshold, decrementing a number of assigned tokens to the partition of the system-wide index for a next time period.

18. The method of claim 16, further comprising:

receiving, at the server, one or more tokens previously transmitted in response to the received multiple requests along with indications that the data is written to the partition of the system-wide index successfully; and in response to receiving the token previously transmitted, calculating a percentage or ratio of a number of the received one or more tokens over the number of the transmitted tokens;

determining whether the calculated percentage or ratio exceeds a threshold; and in response to determining that the calculated percentage or ratio exceeds the threshold, incrementing a number of assigned tokens to the partition of the system-wide index for a next time period.

19. The method of claim 16, further comprising:

receiving, at the server, one or more tokens previously transmitted in response to the received multiple requests along with indications that the data is written to the partition of the system-wide index successfully; and in response to receiving the token previously transmitted, calculating a percentage or ratio of a number of the received one or more tokens over the number of the transmitted tokens;

determining whether the calculated percentage or ratio exceeds a threshold; and in response to determining that the calculated percentage or ratio exceeds the threshold, continue incrementing a number of assigned tokens to the partition of the system-wide index for subsequent time periods until the calculated percentage or ratio does not exceed the threshold.

20. The method of claim 16, further comprising:

receiving, at the server, one or more tokens previously transmitted in response to the received multiple requests along with indications that the data is written to the partition of the system-wide index successfully; and in response to receiving the token previously transmitted, calculating a percentage or ratio of a number of the received one or more tokens over the number of the transmitted tokens; and adjusting a number of assigned tokens to the partition of the system-wide index for a next time period by an amount based on the calculated percentage or ratio of the number of the received one or more tokens over the number of the transmitted tokens.

* * * * *